United States Patent [19]

Al Ghatta et al.

[11] Patent Number: 5,667,691
[45] Date of Patent: Sep. 16, 1997

[54] PROCESS FOR EXTRACTING WATER AND ACETIC ACID FROM THE AQUEOUS PHASE OF CELLULOSE ACETATE

[75] Inventors: Hussain Al Ghatta, Fiuggi; Arianna Giovannini, Bologna, both of Italy

[73] Assignee: Sinco Engineering S.p.A., Italy

[21] Appl. No.: 641,202

[22] PCT Filed: Jul. 22, 1992

[86] PCT No.: PCT/EP92/01669

§ 371 Date: Mar. 19, 1993

§ 102(e) Date: Mar. 19, 1993

[87] PCT Pub. No.: WO93/03064

PCT Pub. Date: Feb. 10, 1993

Related U.S. Application Data

[63] Continuation of Ser. No. 30,071, Mar. 19, 1993, abandoned.

[30] Foreign Application Priority Data

Jul. 29, 1991 [IT] Italy ............... MI91A2103

[51] Int. Cl.⁶ ................ B01D 11/04; C08B 1/02
[52] U.S. Cl. ............ 210/634; 210/500.3; 264/344; 536/71
[58] Field of Search ............ 210/634, 500.23, 210/500.3; 264/344; 427/212; 536/58, 61, 69, 70, 71

[56] References Cited

U.S. PATENT DOCUMENTS

| | | |
|---|---|---|
| 4,250,331 | 2/1981 | Shimshick . |
| 4,770,780 | 9/1988 | Moses ............... 210/634 |
| 5,049,235 | 9/1991 | Barcus et al. ............ 427/212 X |

FOREIGN PATENT DOCUMENTS

| | | |
|---|---|---|
| 1 451 503 | 7/1966 | France . |
| 3323940 | 1/1985 | Germany . |
| 56-007 602 | 1/1981 | Japan . |
| 2 292 216 | 12/1990 | Japan . |

OTHER PUBLICATIONS

"Removal of organic solvents from pharmaceuticals by extraction with supercritical carbon dioxide". *Chemical Abstracts*, vol. 114, abstract No. 214422k.

*Primary Examiner*—Joseph W. Drodge
*Attorney, Agent, or Firm*—Edward D. Manzo; Mark J. Murphy

[57] ABSTRACT

A new process has been developed for separating the water and acetic acid present in the aqueous phase contained in cellulose acetate flakes precipitated from esterification solutions of cellulose. The process includes the step of simultaneously extracting water and acetic acid from the aqueous phase with supercritical carbon dioxide until the content of water and acetic acid in the flakes is substantially reduced.

8 Claims, 1 Drawing Sheet

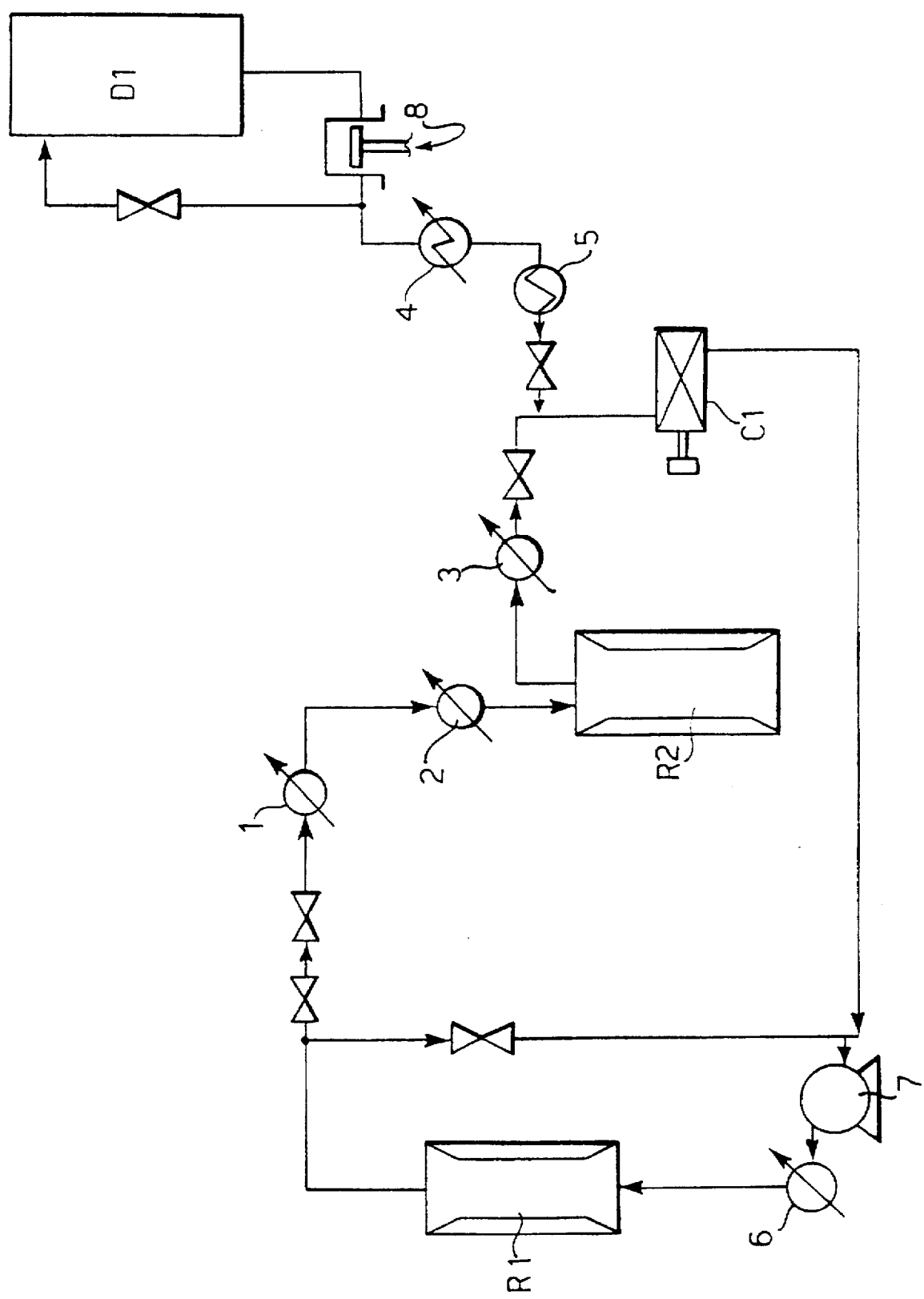

5,667,691

PROCESS FOR EXTRACTING WATER AND ACETIC ACID FROM THE AQUEOUS PHASE OF CELLULOSE ACETATE

This is a continuation of application Ser. No. 08/030,071 filed on Mar. 19, 1993, now abandoned.

FIELD OF THE INVENTION

The present invention refers to a process for the extraction with liquids under supercritical conditions of the aqueous phase present in the flakes of cellulose acetate precipitated from the solutions of the esterification of cellulose.

BACKGROUND OF THE INVENTION

Generally the aqueous phase embedded in the precipitates of cellulose acetate prevailingly comprises acetic acid (ca. 30%) water (ca. 70%) and small quantities of sulphuric acid.

It is well known that cellulose acetate is produced by esterification of cellulose with acetic anhydride in glacial acetic acid as a solvent and using sulphuric acid as catalyst. Diluted acid is used to hydrolize the ester and the sulphate groups. Cellulose acetate is then precipitated by further addition of the diluted acetic acid.

As an example the cellulose acetate flakes are formed of about 15% of cellulose acetate and about 85% of a solution comprising acetic acid, water, sodium sulphate and small amounts of sulphuric acid. The flakes are usually washed with water a pH of 7 is obtained in the washing liquid.

The washed flakes contain ca. 85% by weight of aqueous solution. The flakes are then pressed to reduce the water content to ca. 50% by weight and then dried to a water content of about 1% by weight (Encyclopaedia of Polymer Science and Engineering, 2nd Edition, Vol. 3, page 158, Wiley-Interscience Publication, 1985). This separation process produces remarkable amounts of waste water which need purification before being emitted into the surrounding.

The prior process also produces a great amount of diluted acetic acid which has to be recovered to render the process economically practicable.

The recovery of acetic acid is based on the azeotropic distillation with organic solvents to separate the acid from water.

It has been found that it is possible to reduce the content of the aqueous phase (mainly water and acetic acid) present in the flakes of cellulose acetate precipitated from the solution of esterification of cellulose (the flakes contain up to about 85% or more of a solution comprising water, acetic acid and small amounts of sulphuric acid) without using the numerous washing steps with water and the subsequent drying step which are representative of the processes of the prior art.

SUMMARY OF THE INVENTION

The process of the present invention comprises extracting with a supercritical fluid the solvents present in the precipitate of cellulose acetate deriving from processes of esterification of cellulose. In particular, as a supercritical liquid, carbon dioxide, at a temperature higher than 32° C. and a pressure higher than 7.3 MPa, is used. Preferably the extraction with supercritical $CO_2$ is carried out at temperatures between 80° C. and 100° C. and at a pressure from 12 to 17 MPa.

More preferably the extraction is carried out at temperature of about 90° C. and a pressure of 15 MPa.

Besides lessening the problem of the waste water, the process of the present invention allows recovery of concentrated acetic acid from the liquid wherefrom the supercritical carbon dioxide is removed by reduction of pression and temperature operating under conditions outside the supercritical range according to the well-known process of extraction with supercritical fluids (Kirk-Othmer Encyclopaedia of Chemical Technology, 3rd Edition, Supplement Volume, Page 872, 1984).

BRIEF DESCRIPTION OF THE DRAWINGS

Described the preferred embodiment, reference is made to the accompanying drawing:

FIG. 1 illustrates an example of a system for utilizing the process of the present invention.

DETAILED DESCRIPTION OF THE PREFERRED EMBODIMENTS

For example and with reference to the scheme of FIG. 1, the cellulose acetate in flakes containing up to about 85% by weight of a mixture of water (ca. 70%) and acetic acid (ca. 30%) is loaded into the extractor R1 wherein a flow of supercritical $CO_2$ is circulated to raise the temperature up to the desired value of 80° C.–95° C.

A step of extraction is then carried out at 85° C.–95° C. under a pressure of 15 MPa. The $CO_2$ flow leaving the extractor R1 is expanded to a pressure outside the range of the supercritical conditions for example to 5 MPa and then cooled to room temperature. The flow is then sent to separator R2 wherein the carbon dioxide is separated from the aqueous mixture.

After make up for carbon dioxide from container D1, the flow of carbon dioxide vapors coming from separator R2 is heated by a heat exchanger and then compressed with compressor C1 and thereafter heated to the supercritical conditions and sent to the extractor R1. The extracted liquid phase contains ca. 5% by weight of carbon dioxide and is separated in a continuous process and is sent, after removal of the residual $CO_2$ to the acetic acid recovery section. In the figure reference numerals 1, 2, 3, 4 and 6 are heat exchangers, reference numeral 5 is an evaporator, and reference numerals 7 and 8 are pumps.

With the process of the present invention it is possible to obtain cellulose acetate with a water content of 1–2% by weight and with as little as 10–20 ppm of acetic acid.

The following examples are given to illustrate the invention and not to limit the scope of the same.

EXAMPLE 1

About 30 Kg of cellulose acetate containing 85% by weight of solvent are charged into extractor R1. The solvent is formed of about 70% by weight of water and 30% of acetic acid and contains traces of sulphuric acid.

About 1200 Kg/h of supercritical carbon dioxide are circulated continuously through the extractor until the temperature is increased to about 95° C. The extraction is then carried out at 95° C. and under 15 MPa. The flow of carbon dioxide leaving the extractor R1 is expanded at 50 atm. by a pressure reduction valve, cooled to 25° C. by means of a heat exchanger and finally sent to separator R2 wherein it is evaporated and separated from the extracted aqueous solution.

After make up for carbon dioxide from D1 container, the flow of carbon dioxide vapor coming from separator R2 is heated and then compressed with compressor C1. The liquid carbon dioxide obtained is heated to the supercritical condition and sent to the extractor R1. The extracted liquid contains 5% carbon dioxide by weight; it is sent to the recovery of acetic acid, after removal of carbon dioxide. After 10 hours extraction, the amount of cellulose acetate extracted is 4.5 Kg. The humidity content is about 1% by weight. The extraction conditions are as follows:

Operation: continuous with continuous flow of extractants
Temperature: 95° C.
Pressure: 15 MPa
Extraction time: 10 h
Duration of the cycle: 11 h
Extraction rate: about 40 Kg/h/Kg cellulose acetate

EXAMPLE 2

About 30 Kg of flakes of cellulose acetate precipitate containing 85% by weight of a mixture of acetic acid (30%) and water (70%) and impurities of sodium sulphate are loaded in the extractor used in example 1. About 1200 Kg/h of supercritical carbon dioxide are circulated continuously through the extractor R1 to raise the temperature of the flakes to about 90° C. The aqueous solution is extracted from the flakes at the above temperature and under a pressure of 15 MPa. The flow of supercritical carbon dioxide leaving the extractor is expanded to 5 MPa and then cooled to 25° C. and sent to a separator wherein the vapors are separated from the aqueous mixture. The carbon dioxide vapors are compressed and then heated according to the cycle reported in example 1. After 7 hours extraction the temperature is raised to ca. 100° C. and the extraction continued for an additional 3 hours. The total time of extraction is 10 hours. The quantity of cellulose acetate recovered is 4.6 Kg; the humidity content is 1.5% by weight. The extraction rate is about 40 Kg/h/Kg of cellulose acetate.

EXAMPLE 3

32.7 g of cellulose acetate having the following composition (% by weight):
water: 58.91
acetic acid: 24.18
cellulose acetate: 16.81
sulphuric acid: 0.1
are loaded into 2 cells of a Dionex SSE-703 equipment for supercritical fluid extraction. The temperature of the sample is raised to 80° C. A flow of carbon dioxide under supercritical conditions (12 MPa and 80° C.) is circulated for 50 minutes. The total amount of carbon dioxide used is 6.9 liters (standard conditions).

The sample is then cooled to room temperature. The sample weight is 24.9 g, and the composition (% by weight) is:
cellulose acetate: 22.02
water: 55.24
acetic acid: 22.74

The comparison of the composition before and after extraction shows that 28.7% of water and 28.1% of acetic acid available in the sample are extracted.

The extraction yield, measured as g of total extract/liters of carbon dioxide (standard conditions) is 1.13. The acetic acid water ratio remains practically unaffected.

EXAMPLE 4

A sample of 29.10 g of cellulose acetate having the composition set forth in example 3 is subjected to supercritical extraction under the following conditions:

Temperature: 90° C.
$CO_2$ pressure: 15 MPa
Test time: 120 minutes
$CO_2$ flow: 8.8 l (standard conditions)

After extraction, the sample weight is 25.08 g and its composition (% by weight) is:
cellulose acetate: 19.51
water: 58.93
acetic acid: 21.55

Comparison of the composition before and after extraction shows that 16.6% of available water and acetic acid are extracted.

The extraction yield is 0.46. The acetic acid and water are extracted with different rates i.e. 13.9% of available water and 23% of available acetic acid. The selectivity expressed as the ratio of the acid/water ratio (extracted) to the ratio acid/water (unextracted) is 1.86.

This example shows that it is possible to extract the liquid phase contained in the cellulose acetate with good yield and with high selectivity.

What is claimed is:

1. A process for separating water and acetic acid from the aqueous phase contained in cellulose acetate flakes precipitated from esterification solutions of cellulose, comprising simultaneously extracting water and acetic acid from the aqueous phase with supercritical carbon dioxide until the content of water in the acetate flakes is reduced to approximately 1–2% by weight.

2. Process according to claim 1 wherein the aqueous phase contained in the cellulose acetate flakes contains up to about 85% of a mixture comprising water and acetic acid.

3. The process according to claim 2 wherein the extraction with carbon dioxide is carried out at temperature between 80° C. and 100° C. and at a pressure between 12 MPa and 17 MPa.

4. Process according to claim 1 wherein the extraction with carbon dioxide is carried out at temperatures between 80° C. and 100° C. and under a pressure between 12 to 17 MPa.

5. Process according to claim 4 in which the extraction is carried out at about 90° C. and 15 MPa.

6. Cellulose acetate obtained with the process of claim 1.

7. A process for separating water and acetic acid from the aqueous phase contained in cellulose acetate flakes precipitated from esterification solutions of cellulose, comprising simultaneously extracting water and acetic acid from the aqueous phase with supercritical carbon dioxide until the content of acetic acid in the acetate flakes is reduced to approximately 10–20 ppm.

8. The process according to claim 7 wherein the extraction with carbon dioxide is carried out at a temperature between 80° C. and 100° C. and at a pressure between 12 MPa and 17 MPa.

* * * * *

UNITED STATES PATENT AND TRADEMARK OFFICE
CERTIFICATE OF CORRECTION

PATENT NO. : 5,667,691
DATED : September 16, 1997
INVENTOR(S) : Al Ghatta, et al.

It is certified that error appears in the above-identified patent and that said Letters Patent is hereby corrected as shown below:

Col. 1, ln. 21, before "catalyst", insert --a--.

Col. 1, ln. 23, after "by", insert --the--.

Col. 1, ln. 25, after "example", insert a comma.

Col. 1, ln. 26, delete "of" (first occurrence).

Col. 1, ln. 38, change "surrounding" to --surroundings--.

Col. 1, ln. 66, after "at", insert --a--.

Col. 2, ln. 4, change "pression" to --pressure--.

Col. 2, ln. 13, change "Described" to --Describing--.

Col. 4, ln. 41, change "temperature" to --temperatures--.

Signed and Sealed this

Third Day of March, 1998

*Attest:*

BRUCE LEHMAN

*Attesting Officer*  *Commissioner of Patents and Trademarks*